United States Patent Office 2,964,477
Patented Dec. 13, 1960

2,964,477

PHOSPHATE ESTER COMPOSITIONS

Howard L. Pilat, Valley Stream, and Albert Schrage, Tuckahoe, N.Y., assignors to Celanese Corporation of America, New York, N.Y., a corporation of Delaware No Drawing. Filed Nov. 3, 1955, Ser. No. 544,827

12 Claims. (Cl. 252—49.8)

This invention relates to phosphate ester compositions and relates more particularly to organic phosphate ester compositions containing additives that will improve their viscosity index and simultaneously raise their viscosity.

Phosphate esters have long been used as functional fluids, such as lubricants, hydraulic fluids and the like. For many purposes it would be desirable to improve the viscosity index of these materials to make them more suitable for use under extreme temperature conditions. It would also be desirable to raise the viscosity of the esters so as to make them more fitted for heavy duty use.

It is an important object of this invention to provide a phosphate ester composition which will fulfill the foregoing and other requirements.

A further object of this invention is to provide a phosphate ester composition containing as an additive the linear polyester of (A) a di-(hydroxyaryl)-alkylidene and (B) a monoester of phosphoric acid or a phosphonic acid.

Other objects of this invention will be apparent from the following detailed description and claims.

According to the present invention, it has been found that the viscosity index of organic phosphate esters may be improved by adding thereto the linear polyester of (A) a di-(hydroxyaryl)-alkylidene and (B) a monoester of phosphoric acid or a phosphonic acid in amounts ranging from 0.5 to 15% by weight on the weight of the total mixture. The addition of the polyester also raises the viscosity of the phosphate esters appreciably.

The organic phosphate esters to which this invention is applicable are the well-known alkyl, aryl and mixed alkylaryl esters of phosphoric acid. In this group, the most suitable are the esters of phosphoric acid and lower alkyl substituted phenols which are sold commercially as tricresyl phosphates, and the invention will be described specifically in connection therewith.

The polyesters which are incorporated as additives into the phosphate esters to produce the compositions of this invention may be prepared, for example, by reacting a di-(hydroxyaryl)-alkylidene with phosphoryl dichloride monoester or with a dichloro phosphonic acid and continuing the reaction until the polyester has on the average, at least 6 and preferably between 20 and 100 recurring structural units in the chain. There may be present in the reaction mixture a small proportion of a monofunctional reactant such as a hydroxyaryl compound to assist in obtaining a polyester of the desired chain length.

Examples of suitable di-(hydroxyaryl)-alkylidenes are di(4-hydroxy-3-methylphenyl) dimethyl methane, di-(4-hydroxy-3-methylphenyl) methyl methane, di-(4-hydroxyphenyl) dimethyl methane, di-(4-hydroxyphenyl) methylethyl methane and di-(4-hydroxy-3-methylphenyl) phenyl methane. These di-(hydroxyaryl)-alkylidenes may be reacted with monomethyl, monoethyl, monopropyl, monobutyl, or monophenyl phosphoryl dihalides, for example. They may also be reacted with the monomethyl, monoethyl, monopropyl, or monophenyl phosphonyl dihalides, for example. The monoester phosphonyl dihalides have the formula

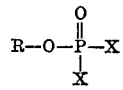

where X is halogen and R is an organic radical. The phosphonyl dihalides have the formula

where R and X have the same meanings. The reaction may be carried out by mixing together the reactants and then, if desired, heating the same to an elevated temperature until the reaction is complete. There may also be present during the reaction an alkaline material to react with the hydrohalic acid liberated during the reaction.

The recurring structural unit of the preferred polyester of this invention may be illustrated as follows:

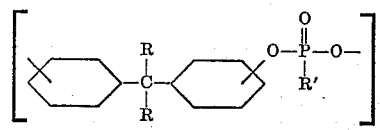

where R is hydrogen or a lower alkyl group and R' is an organic radical such as an alkyl or aryl group, or an OR" radical where R" is an alkyl or aryl group, which groups may, if desired, be further substituted.

The following examples are given to illustrate this invention further.

Example I

There is added slowly with stirring and while maintaining the temperature at 0° C. to 195 parts by weight of benzene phosphonyl dichloride 300 parts by weight of the disodium salt of di-(4-hydroxphenyl)-dimethylmethane as an aqueous solution formed by dissolving di-(4-hydroxyphenyl)-dimethylmethane in a 5% molar excess of 15% by weight of aqueous sodium hydroxide. After the addition is complete, the temperature is raised over a period of 3 hours to 200° C. The mixture is then cooled, the organic phase washed twice with water, and dried by adding benzene and distilling off a benzene-water azeotrope.

To 5 parts by weight of the ester so produced there is added 95 parts by weight of a tricresyl phosphate having a viscosity of 150.8 S.U.S. at 100° F., a viscosity of 40.0 S.U.S. at 210° F. and a viscosity index of —40 (ASTM D567–41). The resultant composition has a viscosity of 206.8 S.U.S. at 100° F., a viscosity of 42.8 at 210° F. and a viscosity index of —6.

Example II

There is added slowly with stirring and while maintaining the temperature at 0° C. to 113 parts by weight of methyl phosphoryl dichloride 300 parts by weight of the disodium salt of di-(4-hydroxyphenyl)-dimethylmethane as an aqueous solution formed by dissolving di-(4-hydroxyphenyl)-dimethyl-methane in a 5% molar excess of 15% by weight of aqueous sodium hydroxide. After the addition is complete, stirring is continued for 3 hours and the temperature permitted to rise to 16° C. The mixture is permitted to stand overnight, the organic phase washed twice with water, and dried by adding benzene and distilling off a benzene-water azeotrope.

To 5 parts by weight of the ester so produced there is added 95 parts by weight of the tricresyl phosphate of Example I. The resultant composition has a viscosity of 225.5 S.U.S. at 100° F., a viscosity of 43.4 at 210° F. and a viscosity index of 9.

It is to be understood that the foregoing detailed description is merely given by way of illustration and that many variations may be made therein without departing from the spirit of our invention.

Having described our invention, what we desire to secure by Letters Patent is:

1. An organic phosphate ester functional fluid containing between 0.5 and 15% by weight of a linear polyester of (A) a di-(hydroxyaryl)-alkylidene and (B) a member of the group consisting of phosphonic acids and monoesters of phosphoric acid, said linear polyester containing at least six recurring structural units of the formula

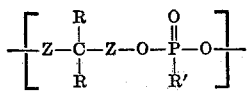

where R is selected from the group consisting of hydrogen and lower alkyl, R' is selected from the group consisting of alkyl and aryl groups and OR'' radicals where R'' is selected from the group consisting of alkyl and aryl groups and Z is a divalent aromatic radical bonded to the divalent carbon atom of the alkylidene group through one of its ring carbon atoms and bonded through another ring carbon atom to an oxygen atom attached to a phosphorus atom, said organic phosphate ester being selected from the group consisting of alkyl, aryl and mixed alkyl-aryl esters.

2. An organic phosphate ester functional fluid composition containing between 0.5 and 15% by weight of a linear polyester of (A) a di-(hydroxyaryl)-alkylidene and (B) a monoester of phosphoric acid, said linear polyester containing at least six recurring structural units of the formula

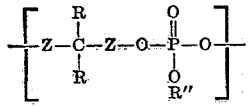

where R is selected from the group consisting of hydrogen and lower alkyl, R'' is selected from the group consisting of alkyl and aryl groups and Z is a divalent aromatic radical bonded to the divalent carbon atom of the alkylidene group through one of its ring carbon atoms and bonded through another ring carbon atom to an oxygen atom attached to a phosphorus atom, said organic phosphate ester being selected from the group consisting of alkyl, aryl and mixed alkyl-aryl esters.

3. An organic phosphate ester functional fluid composition containing between 0.5 and 15% by weight of a linear polyester of (A) a di-(hydroxyaryl)-alkylidene and (B) a phosphonic acid, said linear polyester containing at least six recurring structural units of the formula

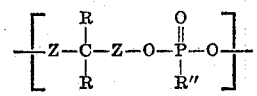

where R is selected from the group consisting of hydrogen and lower alkyl, R'' is selected from the group consisting of alkyl and aryl groups and Z is a divalent aromatic radical bonded to the divalent carbon atom of the alkylidene group through one of its ring carbon atoms and bonded through another ring carbon atom to an oxygen atom attached to a phosphorus atom, said organic phosphate ester being selected from the group consisting of alkyl, aryl and mixed alkyl-aryl esters.

4. An organic phosphate ester functional fluid composition containing between 0.5 and 15% by weight of a linear polyester having the recurring structural unit

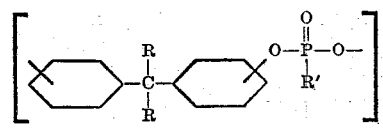

where R is selected from the group consisting of hydrogen and lower alkyl, and R' is selected from the group consisting of alkyl and aryl groups and OR'' radicals where R'' is selected from the group consisting of alkyl and aryl groups, said linear polyester containing at least six recurring structural units, the organic phosphate ester being selected from the group consisting of alkyl, aryl, and mixed alkyl-aryl esters.

5. An organic phosphate ester functional fluid composition containing between 0.5 and 15% by weight of a linear polyester having the recurring structural unit

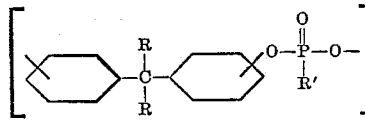

where R is selected from the group consisting of hydrogen and lower alkyl and R' is selected from the group consisting of alkyl and aryl groups and OR'' radicals where R'' is a member of the group consisting of alkyl and aryl groups and containing between 20 and 100 recurring structural units, the organic phosphate ester being selected from the group consisting of alkyl, aryl, and mixed alkyl-aryl esters.

6. A composition consisting essentially of an aryl ester of phosphoric acid, and between 0.5 and 15% by weight of a linear polyester of (A) a di-(hydroxyaryl)-alkylidene and (B) a member of the group consisting of phosphonic acids and monoesters of phosphoric acid, said linear polyester containing at least six recurring structural units of the formula

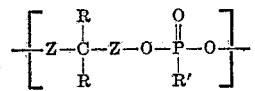

where R is selected from the group consisting of hydrogen and lower alkyl, R' is selected from the group consisting of alkyl and aryl groups and OR'' radicals where R'' is selected from the group consisting of alkyl and aryl groups and Z is a divalent aromatic radical bonded to the divalent carbon atom of the alkylidene group through one of its ring carbon atoms and bonded through another ring carbon atom to an oxygen atom attached to a phosphorus atom, said organic phosphate ester being selected from the group consisting of alkyl, aryl and mixed alkyl-aryl esters.

7. A composition consisting essentially of an ester of phosphoric acid and a lower alkyl substituted phenol, and between 0.5 and 15% by weight of a linear polyester of (A) a di-(hydroxyaryl)-alkylidene and (B) a member of the group consisting of phosphonic acids and monoesters of phosphoric acid, said linear polyester containing at least six recurring structural units of the formula

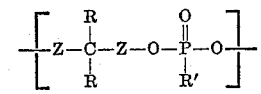

where R is selected from the group consisting of hydrogen and lower alkyl, R' is selected from the group consisting of alkyl and aryl groups and OR'' radicals where R'' is selected from the group consisting of alkyl and aryl groups and Z is a divalent aromatic radical bonded to the divalent carbon atom of the alkylidene group through one of its ring carbon atoms and bonded through another ring carbon atom to an oxygen atom attached to a phosphorus atom, said organic phosphate ester being selected from the group consisting of alkyl, aryl and mixed alkyl-aryl esters.

8. A composition consisting essentially of an ester of phosphoric acid and a lower alkyl substituted phenol, and between 0.5 and 15% by weight of a linear polyester of (A) di-(4-hydroxyphenyl)-dimethylmethane and (B) a member of the group consisting of phosphonic acids and monoesters of phosphoric acid, said linear polyester containing at least six recurring structural units of the formula

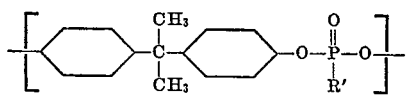

where R' is selected from the group consisting of alkyl and aryl groups and OR'' radicals where R'' is selected from the group consisting of alkyl and aryl groups.

9. A composition consisting essentially of tricresyl phosphate and between 0.5 and 15% by weight of a linear polyester of (A) di-(4-hydroxydiphenyl)-dimethylmethane and (B) the monomethyl ester of phosphoric acid, said linear polyester containing at least six recurring structural units of the formula

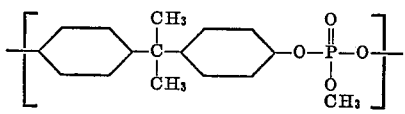

10. A composition consisting essentially of tricresyl phosphate and between 0.5 and 15% by weight of a linear polyester of (A) di-(4-hydroxydiphenyl)-dimethylmethane and (B) benzene phosphonic acid, said linear polyester containing at least six recurring structural units of the formula

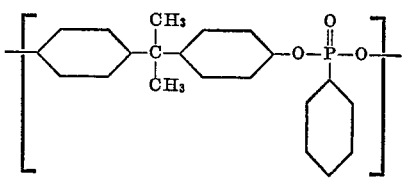

11. The method of lubricating surfaces which move in frictional contact with each other which comprises applying to said surfaces a mixture of a phosphate ester of the group consisting of alkyl, aryl and mixed alkyl-aryl esters and between about 0.5 and 15% by weight of a linear polyester of (A) a di-(hydroxyaryl)-alkylidene and (B) a member of the group consisting of phosphonic acids and monoesters of phosphoric acid, said linear polyester containing at least six recurring structural units of the formula

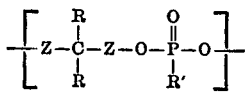

where R is selected from the group consisting of hydrogen and lower alkyl, R' is selected from the group consisting of alkyl and aryl groups and OR'' radicals where R'' is selected from the group consisting of alkyl and aryl groups and Z is a divalent aromatic radical bonded to the divalent carbon atom of the alkylidene group through one of its ring carbon atoms and bonded through another ring carbon atom to an oxygen atom attached to a phosphorus atom.

12. The method of lubricating surfaces which move in frictional contact with each other which comprises applying to said surfaces a mixture of a phosphate ester of the group consisting of alkyl, aryl and mixed alkyl-aryl esters and between about 0.5 and 15% by weight of a linear polyester of (A) di-(4-hydroxyphenyl)-dimethylmethane and (B) a member of the group consisting of phosphonic acid and monoesters of phosphoric acid, said linear polyester containing at least six recurring structural units of the formula

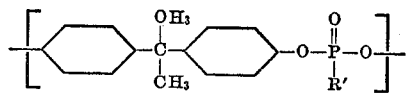

where R' is selected from the group consisting of alkyl and aryl groups and OR'' radicals where R'' is selected from the group consisting of alkyl and aryl groups.

References Cited in the file of this patent
UNITED STATES PATENTS

| | | |
|---|---|---|
| 2,058,394 | Arvin | Oct. 27, 1936 |
| 2,133,311 | Shuman | Oct. 18, 1938 |
| 2,435,252 | Toy | Feb. 3, 1948 |
| 2,512,582 | Plueddemann | June 20, 1950 |
| 2,549,270 | Watson | Apr. 17, 1951 |
| 2,566,623 | Moreton | Sept. 4, 1951 |
| 2,572,076 | Toy | Oct. 23, 1951 |
| 2,596,141 | Gamrath | May 13, 1952 |
| 2,612,488 | Nelson | Sept. 30, 1952 |
| 2,636,861 | Watson | Apr. 28, 1953 |
| 2,674,590 | Zenftman | Apr. 6, 1954 |
| 2,716,101 | Coover et al. | Aug. 23, 1955 |
| 2,743,258 | Coover et al. | Apr. 24, 1956 |